US008888441B2

(12) United States Patent
Jordy et al.

(10) Patent No.: US 8,888,441 B2
(45) Date of Patent: Nov. 18, 2014

(54) SEGMENTED SEAL ASSEMBLY

(75) Inventors: Daniel Edward Jordy, Glenville, NY (US); William Edward Adis, Scotia, NY (US); Bernard Arthur Couture, Jr., Schenectady, NY (US); Dexter Andrew Young, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 613 days.

(21) Appl. No.: 13/197,532

(22) Filed: Aug. 3, 2011

(65) Prior Publication Data
US 2013/0034428 A1 Feb. 7, 2013

(51) Int. Cl.
*F01D 11/12* (2006.01)
*F01D 11/02* (2006.01)
*F16J 15/44* (2006.01)

(52) U.S. Cl.
CPC .............. *F01D 11/02* (2013.01); *F01D 11/025* (2013.01); *F05D 2260/36* (2013.01); *F05D 2230/642* (2013.01); *F05D 2220/31* (2013.01); *F05D 2250/37* (2013.01); *F16J 15/442* (2013.01)
USPC ........ 415/111; 415/138; 415/139; 415/173.7; 415/174.2; 415/230

(58) Field of Classification Search
CPC ............ F05D 2240/58; F05D 2250/37; F05D 2260/36; F01D 11/00; F01D 11/02; F01D 11/025; F01D 11/003; F01D 11/001; F16J 15/16; F16J 15/442; F16J 15/447
USPC .......... 277/411–413, 416; 415/110, 111, 134, 415/139, 138, 170.1, 173.7, 174.2, 229, 230
See application file for complete search history.

(56) References Cited

U.S. PATENT DOCUMENTS

| 5,026,075 A | 6/1991 | Massarani |
| 5,201,530 A | 4/1993 | Kelch et al. |
| 6,331,006 B1 | 12/2001 | Baily et al. |
| 7,631,879 B2 | 12/2009 | Diantonio |
| 8,132,815 B1 | 3/2012 | Dillon |
| 8,348,280 B2 | 1/2013 | Pandey et al. |

(Continued)

FOREIGN PATENT DOCUMENTS

| EP | 1790883 A1 * | 5/2007 | .............. F01D 11/00 |
| FR | 2966504 A1 | 4/2012 | |
| GB | 2480680 A | 11/2011 | |

OTHER PUBLICATIONS

Search Report and Written Opinion from FR Application No. 1257396 dated Jul. 10, 2013.

(Continued)

*Primary Examiner* — Edward Look
*Assistant Examiner* — Juan G Flores
(74) *Attorney, Agent, or Firm* — Hoffman Warnick LLC; Ernest G. Cusick

(57) ABSTRACT

Systems and devices for sealing portions of a rotary machine are disclosed. In one embodiment, a seal assembly element includes: a head flange; an axial neck connected to the head flange, wherein the axial neck includes a mating flange extending circumferentially from a distal end of the seal assembly element, the mating flange configured to form a multidirectional seal with a recessed portion of a complementary seal assembly element; and a set of axial seal teeth connected to the axial neck.

17 Claims, 7 Drawing Sheets

(56) References Cited

U.S. PATENT DOCUMENTS

| | | |
|---|---|---|
| 8,459,653 B2 | 6/2013 | Zheng |
| 2002/0190474 A1 | 12/2002 | Turnquist et al. |
| 2006/0151958 A1* | 7/2006 | Chevrette et al. ............. 277/411 |
| 2008/0296847 A1* | 12/2008 | Chevrette et al. ............. 277/422 |
| 2009/0051117 A1 | 2/2009 | Crudgington |
| 2012/0098211 A1 | 4/2012 | Pandey et al. |
| 2013/0058765 A1 | 3/2013 | Zheng et al. |

OTHER PUBLICATIONS

U.S. Appl. No. 13/227,218, Office Action dated May 8, 2014.

\* cited by examiner

SEGMENTED SEAL ASSEMBLY

BACKGROUND OF THE INVENTION

The subject matter disclosed herein relates to rotary machines and, more particularly, to systems and devices for sealing and/or substantially fluidly isolating portions of a rotary machine.

The design and operation of some rotary machines (e.g. steam turbines) include the use of seal assemblies. These seal assemblies may include any number of segments/elements which are assembled between portions of the turbine, the elements being disposed relative one another so as to form a seal or barrier. During operation, these seal assemblies may substantially separate stationary and/or rotary portions of the turbine. However, variances in thermal expansion rates and steam turbine operating temperatures may require clearances between each of the elements of these seal assemblies. These clearances between the seal assembly elements may create gaps between those elements, thereby enabling leakage of a fluid through the seal assembly. This leakage may damage components in the turbine and/or decrease the efficiency of the steam turbine. Some turbines may limit leakage through these thermal spaces by placing a separate sealing strip at the gap in between elements of the seal assembly, thereby limiting axial leakage. However, this sealing strip fails to prevent radial leakage through the thermal gap between segments of the seal assembly.

BRIEF DESCRIPTION OF THE INVENTION

Systems and devices for sealing gaps between segments of a seal assembly are disclosed. In one embodiment, a seal assembly element includes: a head flange; an axial neck connected to the head flange, wherein the axial neck includes a mating flange extending circumferentially from a distal end of the seal assembly element, the mating flange configured to form a multidirectional seal with a recessed portion of a complementary seal assembly element; and a set of axial seal teeth connected to the axial neck.

A first aspect of the disclosure provides a seal assembly element including: a head flange; an axial neck connected to the head flange, wherein the axial neck includes a mating flange extending circumferentially from a distal end of the seal assembly element, the mating flange configured to form a multidirectional seal with a recessed portion of a complementary seal assembly element; and a set of axial seal teeth connected to the axial neck.

A second aspect provides a seal assembly including: a set of seal assembly elements physically connected to one another so as to form a substantially continuous body, wherein each of the seal assembly elements includes: a head flange; an axial neck connected to the head flange, wherein the axial neck includes a mating flange extending circumferentially from a distal end of the seal assembly element, the mating flange configured to form a multidirectional seal with a recessed portion of a complementary seal assembly element; and a set of axial seal teeth connected to the axial neck.

A third aspect provides a turbine including: a stator; a rotor disposed substantially within the stator; and a seal assembly connected to the stator, the seal assembly comprising: a set of seal assembly elements physically connected to one another so as to form a substantially continuous body, wherein each of the seal assembly elements includes: a head flange; an axial neck connected to the head flange, wherein the axial neck includes a mating flange extending circumferentially from a distal end of the seal assembly element, the mating flange configured to form a multidirectional seal with a recessed portion of a complementary seal assembly element; and a set of axial seal teeth connected to the axial neck.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
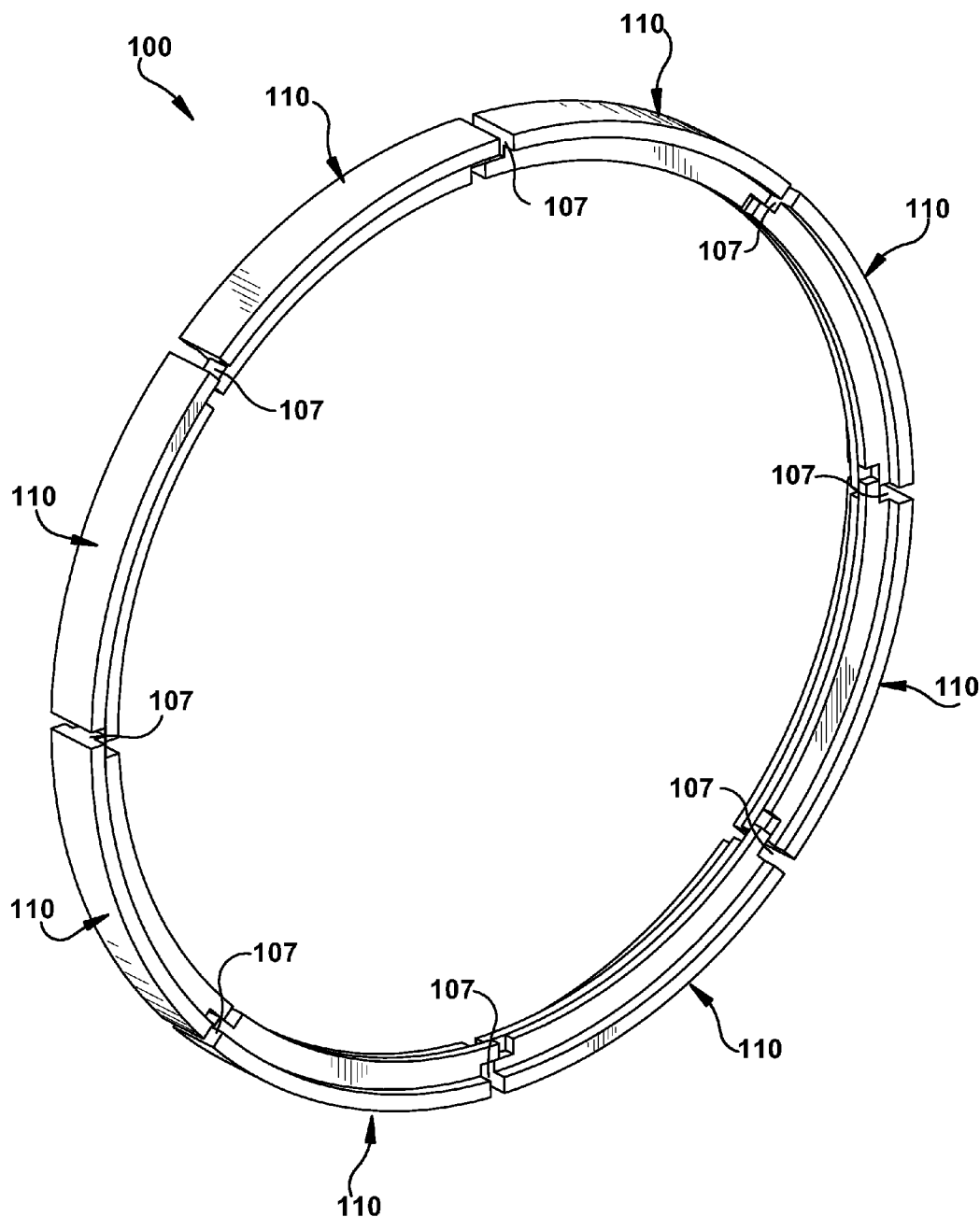
FIG. 1 shows a three-dimensional perspective view of a seal assembly system including a set of seal assembly elements, in accordance with aspects of the invention.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, aspects of the invention provide for systems and devices configured to substantially fluidly isolate portions of a rotary machine by providing a seal assembly. The seal assembly includes a plurality of complementary seal assembly elements which are designed to connect with one another so as to form a substantially continuous body, thereby substantially fluidly isolating portions of the rotary machine. These complementary seal assembly elements are configured such that, at each distal/circumferential end a male or a female overlap segment is included. Each overlap segment including at least one of: a radial, an axial and/or a circumferential mating surface. These mating surfaces are configured to complement a counterpart (male or female) distal end in an adjacent seal assembly element to form a multidirectional seal.

In the art of power generation systems (including, e.g., nuclear reactors, steam turbines, gas turbines, etc.), seal assemblies are often included as part of the system, substantially fluidly isolating and defining sections of a rotary machine. Typically, these seal assemblies employ multiple elements assembled together to prevent against fluid leakage between different sections of the rotary machine. However, clearances/tolerances may be required between elements in the seal assembly in order to prevent the elements from binding with one another as a result of thermal expansion. These clearances may enable fluid leakage through the seal assembly, thereby decreasing the efficiency of the rotary machine and/or damaging components.

Turning to the FIGURES, embodiments of a seal assembly are shown including a plurality of seal assembly elements. The seal assembly elements may increase the efficiency of a rotary machine, a turbine, and/or an overall power generation system by reducing the amount of leakage allowed through the element joints of the seal assembly. Each of the components in the figures may be connected via conventional means, e.g., via a common conduit or other known means as is indicated in FIGS. 1-7. Specifically, referring to FIG. 1, a three-dimensional schematic view of an embodiment of a seal assembly system 100 is shown. Seal assembly system 100 may include a plurality of seal assembly elements 110 assembled into a substantially continuous body. Seal assembly system 100 may be used as a barrier/seal between separate portions and/or sections of a rotary machine (shown in FIG. 3 as item 390). In an embodiment of the present invention, seal assembly system 100 may include a clearance gap 107 between each seal assembly element 110. In one embodiment, adjacent seal assembly elements 110 may partially overlap at each respective clearance gap 107. In one embodiment, seal assembly elements 110 may be configured with a curved shape such that assembly of a number of seal assembly elements 110 may form a substantially circular and/or elliptical continuous body. Connection, assembly and manner of assembly of seal assembly elements 110 may be accomplished in any number of ways as discussed further below or known in the art.

Figure 2:
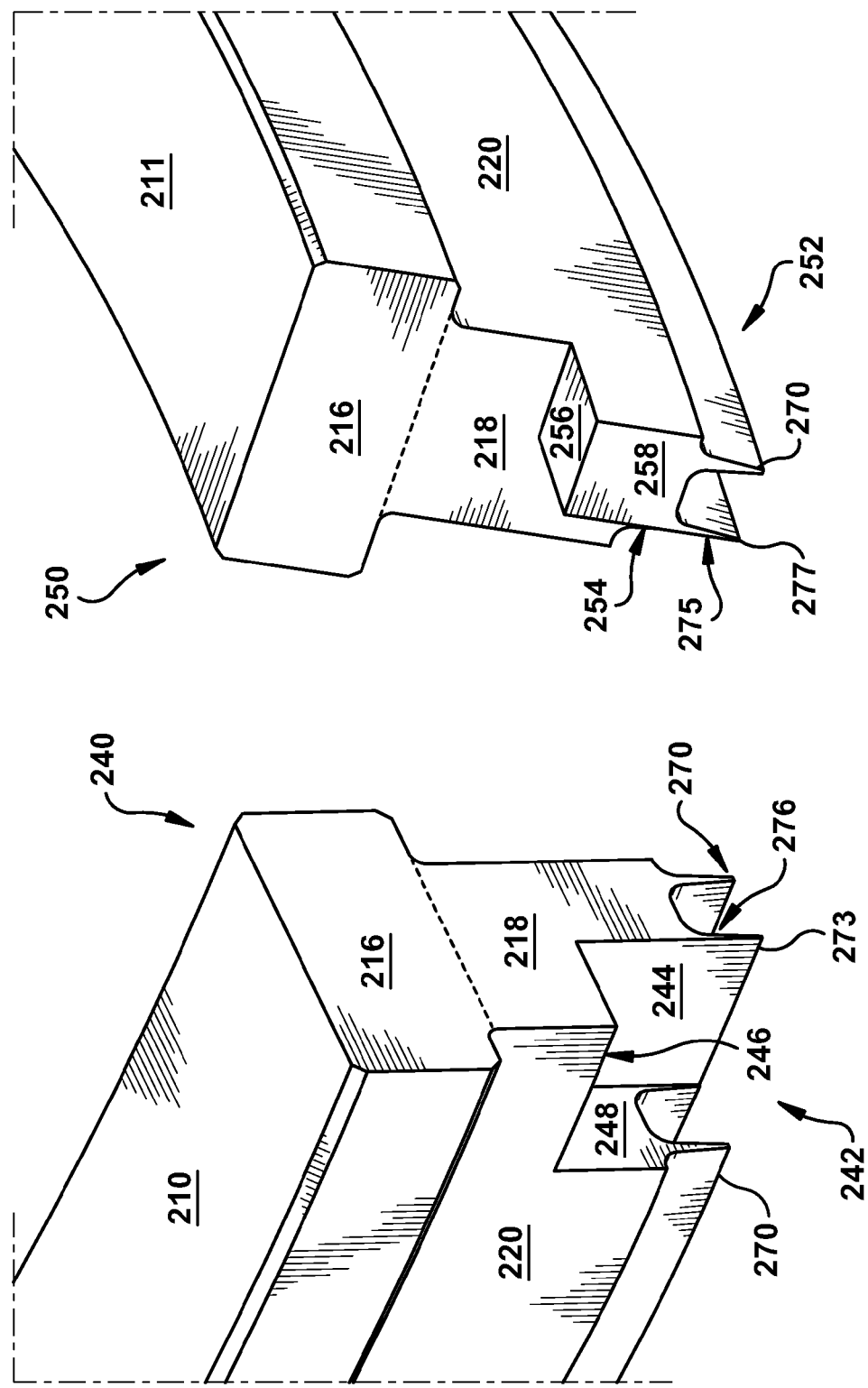
FIG. 2 shows a three-dimensional perspective view of portions of a set of seal assembly elements in accordance with an aspect of the invention.

Turning to FIG. 2, a three-dimensional perspective view of complementary portions of a seal assembly element 210 and a seal assembly element 211 are shown according to embodiments. It is understood that elements similarly numbered between FIG. 1 and FIG. 2 may be substantially similar as described with reference to FIG. 1. Further, in embodiments shown and described with reference to FIGS. 2-7, like numbering may represent like elements. Redundant explanation of these elements has been omitted for clarity. Finally, it is understood that the components of FIGS. 1-7 and their accompanying descriptions may be applied to any embodiment described herein. Returning to FIG. 2, in this embodiment, seal assembly elements 210 and 211 may include a head flange 216 and an axial neck 218. Axial neck 218 extends radially inward, substantially defining a sealing surface 220. In one embodiment, axial neck 218 of seal assembly element 210 may include a female distal/circumferential end portion 240 and axial neck 218 of seal assembly element 211 may include a male distal/circumferential end portion 250. Male end portion 250 includes a mating flange 252 which is configured to extend circumferentially and complement a recessed portion 242 of female end portion 240. In one embodiment, male end portion 250 and female end portion 240 may be connected so as to form a zero-clearance seal. Mating flange 252 may include an axial mating surface 254 (not visible from this perspective), a radial mating surface 256 and a circumferential mating surface 258. Recessed portion 242 may substantially define in axial neck 218, an axial mating surface 244, a radial mating surface 246 and a circumferential mating surface 248. In one embodiment, mating flange 252 of seal assembly element 211 may be disposed within recessed portion 242 of seal assembly element 210 so as to form a bidirectional and/or multidirectional seal. In one embodiment, seal assembly elements 210 and 211 may include a plurality of sealing teeth 270 (e.g., axial seal teeth) disposed upon axial neck 218. In one embodiment, mating flange 252 and female end portion 240 may each partially form one of sealing teeth 270. In another embodiment, mating flange 252 and female end portion 240 may be configured with axial mating surfaces 254 and 244 at a center of one of sealing teeth 270. One of the sealing teeth 270 including a mating flange segment 275 and a female end segment 276. As a result, joining of mating surfaces 254 and 244 substantially connects mating flange segment 275 and female end segment 276, thereby substantially forming one of sealing tooth 270. In one embodiment, mating flange segment 275 includes a tip portion 277 of one of sealing teeth 270. A complementary tip portion 273 may be included in complementary female end segment 276. In one embodiment, seal assembly element 210 includes a male end portion 250 disposed on a distal end substantially opposite female end portion 240. In another embodiment, seal assembly element 211 may include a female end portion 240 disposed on a distal end substantially opposite male end portion 250.

Figure 3:
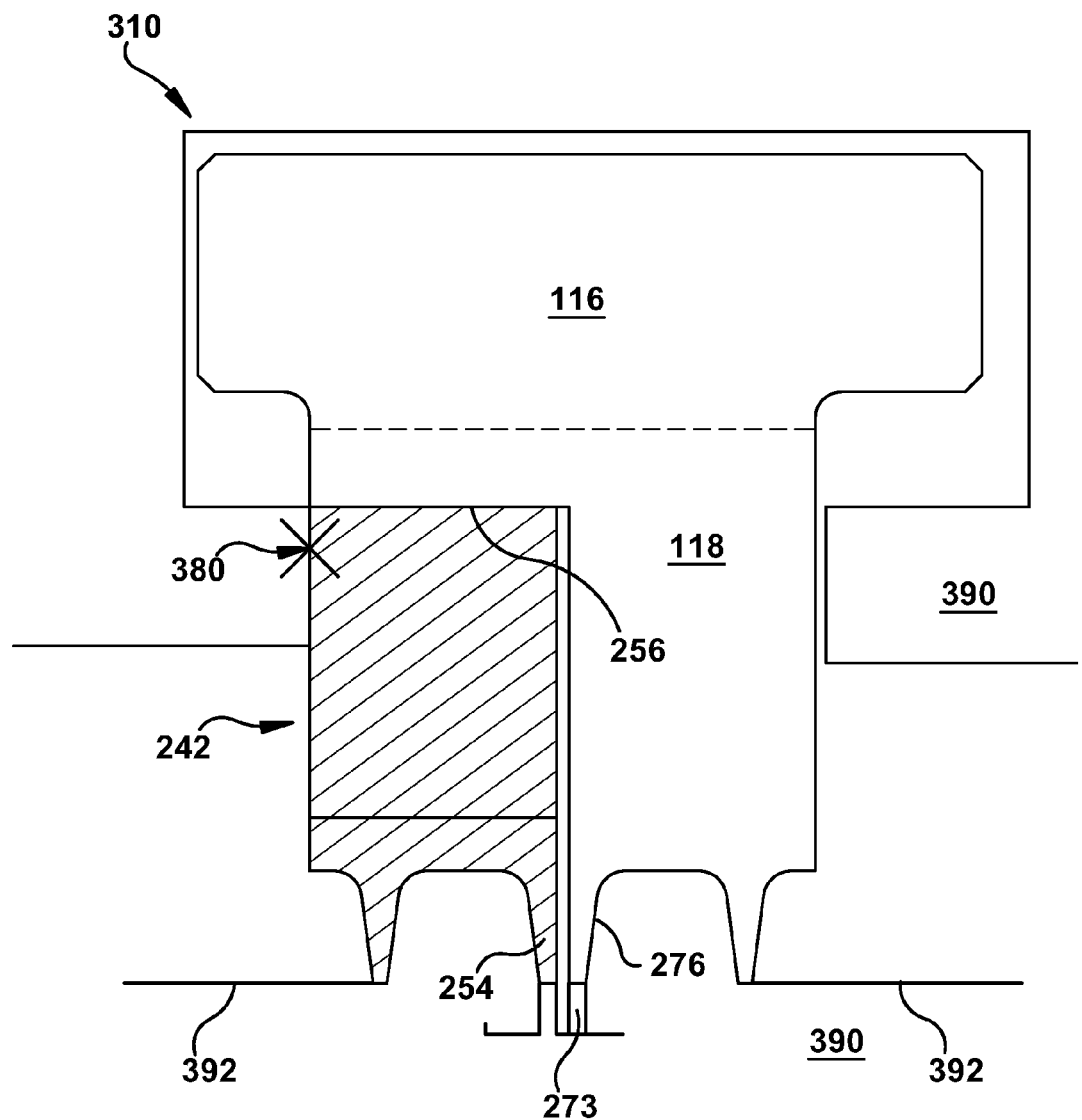
FIG. 3 shows a partial cut-away end view of a seal assembly element in accordance with an aspect of the invention.

Turning to FIG. 3, a partial cut-away view of a seal assembly element 310 including a head flange 116 and an axial neck 118, is shown substantially defining female end segment 276 (a portion of a sealing tooth 270 shown in FIG. 2) within a rotary machine 390. In this embodiment, recessed portion 242 is defined by axial neck 118 substantially proximate a steam joint 380. Steam joint 380 is located between rotary machine 390 and seal assembly element 310. Recessed portion 242 and axial neck 118 substantially define axial mating surface 254 and radial mating surface 256, thereby enabling a bidirectional overlap substantially proximate steam joint 380 with mating flange 252 (shown in FIG. 2). Female end segment 276, is configured to substantially complement mating flange segment 275 (shown in FIG. 2), thereby forming a substantially continuous axial seal tooth 270. In this embodiment, axial mating surface 254 extends through tip portion 273 of sealing tooth 270 such that an overlap between seal assembly elements 310 and 211 (shown in FIG. 2) extends to a sealing/mating surface 392 with rotary machine 390.

Figure 4:
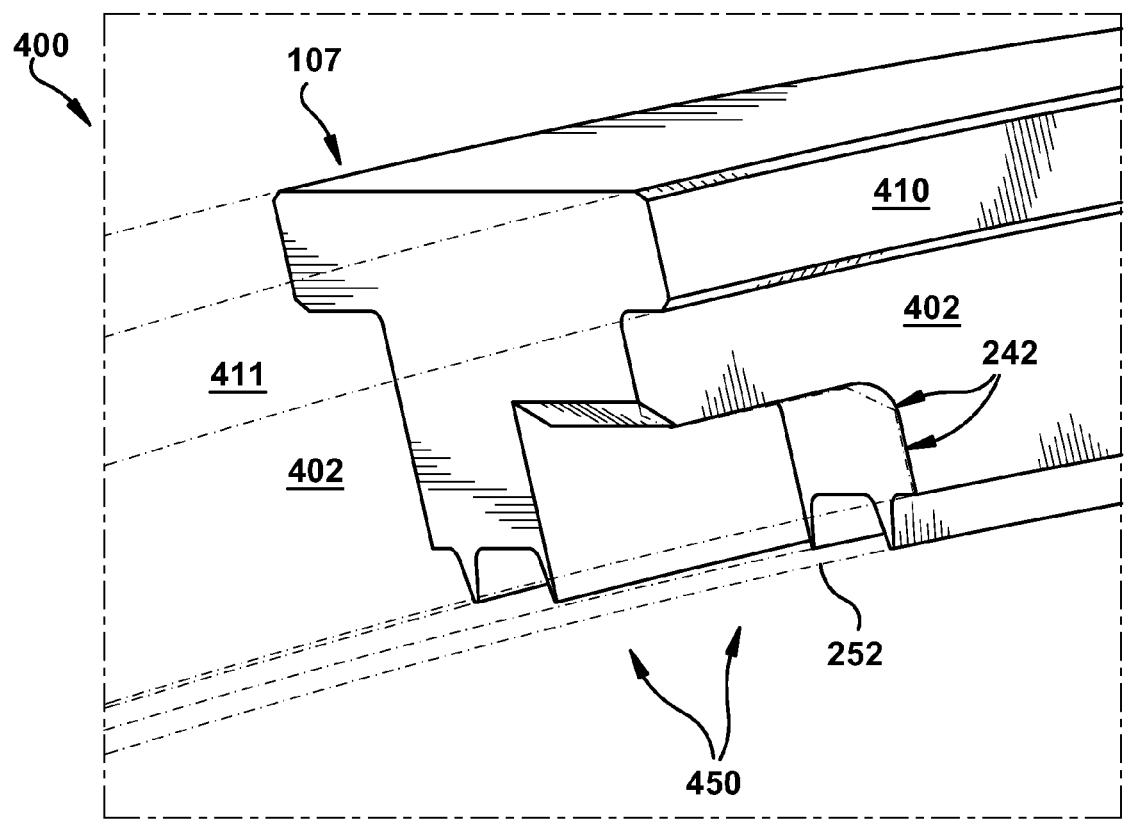
FIG. 4 shows a three-dimensional partial cut-away perspective view of a seal assembly system in accordance with aspects of the invention.

Turning to FIG. 4, a three-dimensional partial cut-away perspective view of a seal assembly system 400 in accordance with aspects of the invention is shown having a seal assembly element 410 connected to a seal assembly element 411. In this embodiment, mating flange 252 of seal assembly element 411 is disposed within recessed portion 242 of seal assembly element 410. As a result, mating flange 252 overlaps with seal assembly element 410 forming a multidirectional seal 450, thereby substantially sealing clearance gap 107 between seal assembly elements 410 and 411. In one embodiment, a sealing surface 402 of seal assembly system 400 faces steam joint 380 (shown in FIG. 3). In another embodiment, mating flange 252 overlaps with seal assembly element 410 forming multidirectional seal 450 at steam joint 380.

Figure 5:
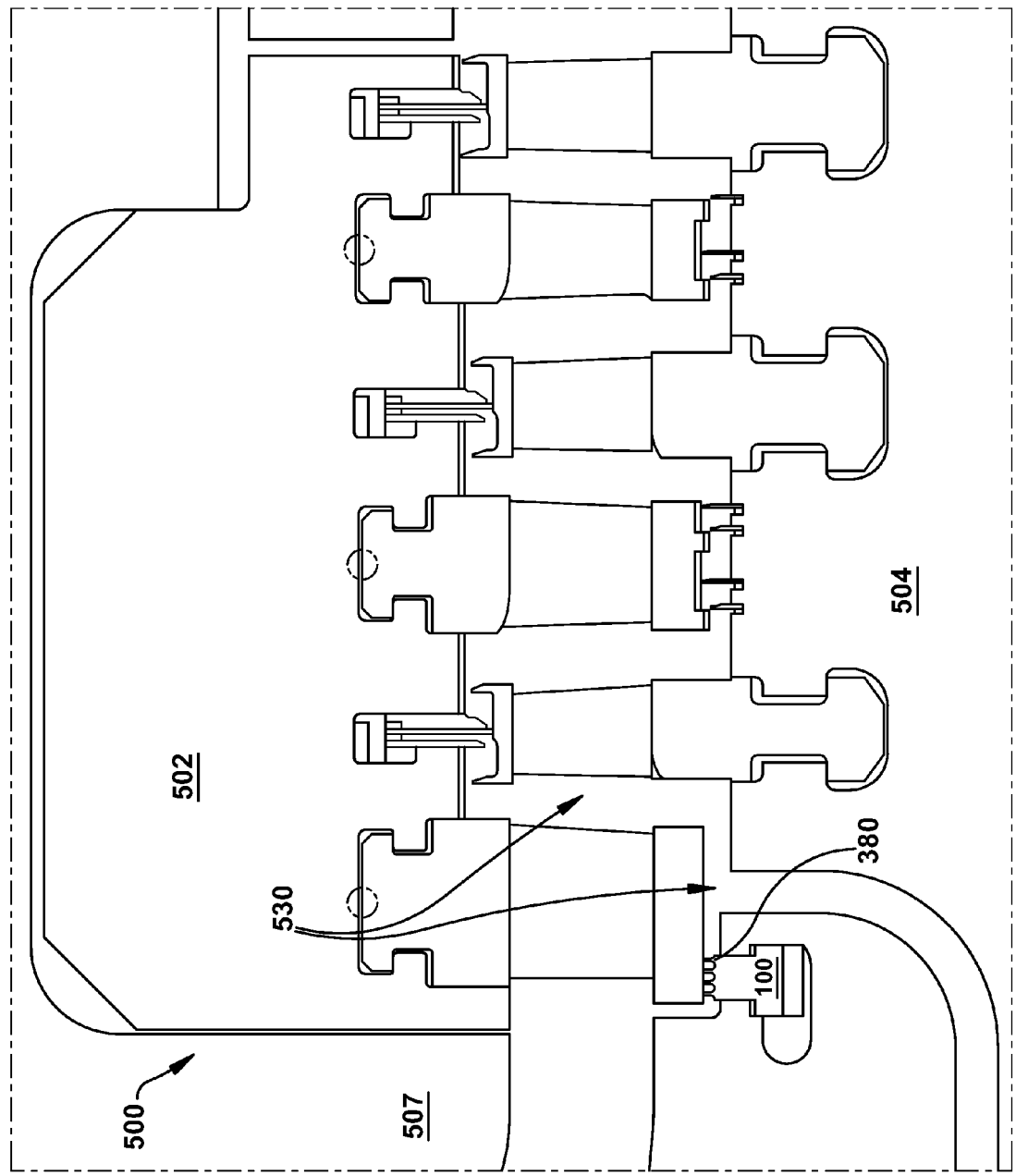
FIG. 5 shows a partial cut-away schematic view of a turbine in accordance with an aspect of the invention.

Turning to FIG. 5, a partial cut-away of a turbine 500 is shown having seal assembly 100 disposed upon steam joint 380 of turbine 500 in accordance with an aspect of the invention. In this embodiment, turbine 500 includes a stator 502, a rotor 504 substantially enclosed by stator 502 and a packing head 507 fluidly connected to stator 502 and rotor 504. In one embodiment seal assembly system 100 substantially fluidly isolates a first nozzle stage 530 and packing head 507. In one embodiment, mating flange 252 (shown in FIG. 2) is configured radially inboard of steam joint 380. In another embodiment, mating flange 252 may be configured substantially proximate steam joint 380 (i.e. near but not necessarily touching). It is understood that the location of seal assembly system 100 in this embodiment is not limited to this exemplary embodiment as seal assembly system 100 may be disposed within any section of a turbine 500 or like turbine known in the art. In one embodiment, seal assembly system 100 and/or seal assembly elements 110 may be inspringing relative to turbine 500. Seal assembly system 100 and/or seal assembly elements 110 being partially affixed within turbine 500 via springs which press seal assembly system 100 and/or seal assembly elements 110 radially inward. In another embodiment, seal assembly system 100 and/or seal assembly elements 110 may be outspringing relative to turbine 500. Seal assembly system 100 and/or seal assembly elements 110 being partially affixed within turbine 500 via springs which press seal assembly system 100 and/or seal assembly elements 110 radially outward.

Figure 6:
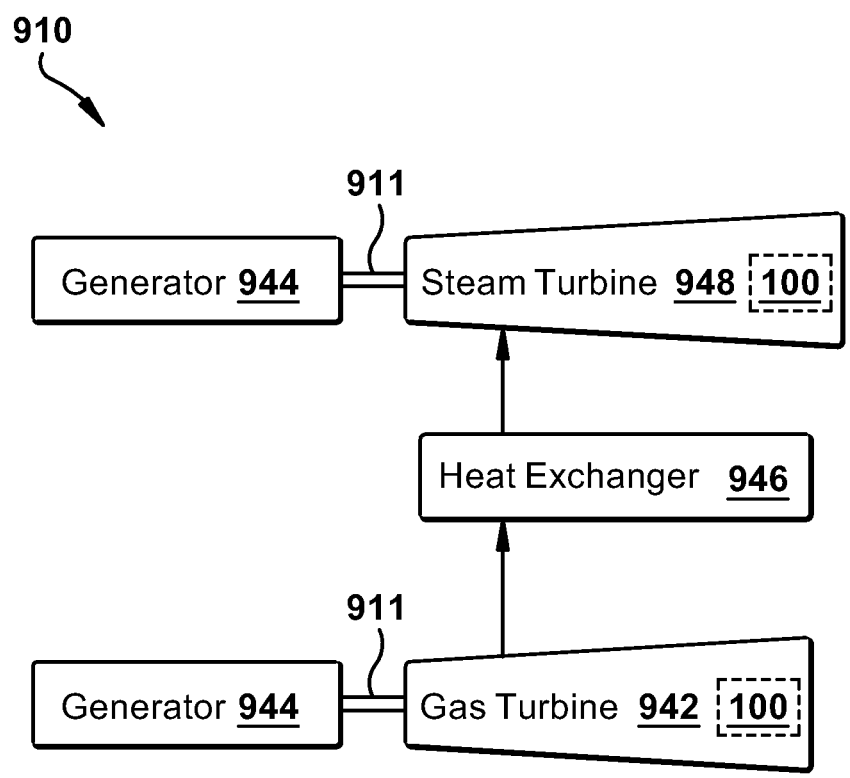
FIG. 6 shows a schematic view of portions of a multi-shaft combined cycle power plant in accordance with an aspect of the invention.
Figure 7:
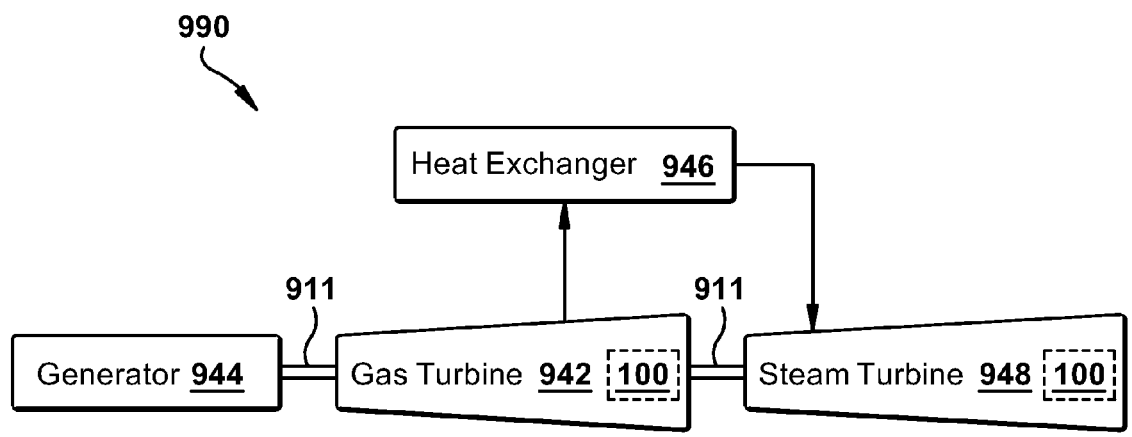
FIG. 7 shows a schematic view of a single shaft combined cycle power plant in accordance with an aspect of the invention.

Turning to FIG. 6, a schematic view of portions of a multi-shaft combined cycle power plant 910 is shown. Combined cycle power plant 910 may include, for example, a gas turbine 942 operably connected to a generator 944. Generator 944 and gas turbine 942 may be mechanically coupled by a shaft 911, which may transfer energy between a drive shaft (not shown) of gas turbine 942 and generator 944. Also shown in FIG. 6 is a heat exchanger 946 operably connected to gas turbine 942 and a steam turbine 948. Steam turbine 948 and/or gas turbine 942 may include seal assembly system 100 of FIG. 1 or other embodiments described herein. Heat exchanger 946 may be fluidly connected to both gas turbine 942 and a steam turbine 948 via conventional conduits (numbering omitted). Heat exchanger 946 may be a conventional heat recovery steam generator (HRSG), such as those used in conventional combined cycle power systems. As is known in the art of power generation, HRSG 946 may use hot exhaust from gas turbine 942, combined with a water supply, to create steam which is fed to steam turbine 948. Steam turbine 948 may optionally be coupled to a second generator system 944 (via a second shaft 911). It is understood that generators 944 and shafts 911 may be of any size or type known in the art and may differ depending upon their application or the system to which they are connected. Common numbering of the generators and shafts is for clarity and does not necessarily suggest these generators or shafts are identical. Generator system 944 and second shaft 911 may operate substantially similarly to generator system 944 and shaft 911 described above. In another embodiment, shown in FIG. 7, a single shaft combined cycle power plant 990 may include a single generator 944 coupled to both gas turbine 942 and steam turbine 946 via a single shaft 911. Steam turbine 946 and/or gas turbine 942 may include seal assembly system 100 of FIG. 1 or other embodiments 210, 310, 400, or 500 described herein.

The seal assembly systems and devices of the present disclosure are not limited to any one particular rotary machine, turbine, generator, power generation system or other system, and may be used with other power generation systems and/or systems (e.g., combined cycle, simple cycle, nuclear reactor, etc.). Additionally, the seal assembly systems and devices of the present invention may be used with other systems not described herein that may benefit from the separation and protection of the seal assembly systems and devices described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seal assembly element comprising:
   a head flange;
   an axial neck connected to the head flange, wherein the axial neck includes a mating flange extending circumferentially from a distal end of the seal assembly element, the mating flange configured to form a multidirectional seal with a recessed portion of a complementary seal assembly element; and
   a set of axial seal teeth connected to the axial neck, wherein the mating flange includes a partial segment of a tip portion of an axial seal tooth in the set of axial seal teeth.

2. The seal assembly element of claim 1, wherein the mating flange includes at least one of: an axial mating surface, a circumferential mating surface or a radial mating surface.

3. The seal assembly element of claim 1 further comprising a recessed portion disposed proximate a distal end of the seal assembly element, the recessed portion configured to form a multidirectional seal with a mating flange of a complementary seal assembly element.

4. The seal assembly element of claim 3, wherein the recessed portion includes at least one of: an axial mating surface, a circumferential mating surface or a radial mating surface.

5. The seal assembly element of claim 1, wherein the mating flange includes at least a portion of an axial seal tooth in the set of axial seal teeth.

6. The seal assembly element of claim 1, wherein at least one of the axial seal teeth in the set of axial seal teeth is divided between the mating flange and the recessed portion.

7. The seal assembly element of claim 1, wherein the seal assembly element is further configured with a curved shape.

8. A seal assembly comprising:
   a set of seal assembly elements physically connected to one another so as to form a substantially continuous body, wherein each of the seal assembly elements includes:
   a head flange;
   an axial neck connected to the head flange, wherein the axial neck includes a mating flange extending circumferentially from a distal end of the seal assembly element, the mating flange configured to form a multidirectional seal with a recessed portion of a complementary seal assembly element; and
   a set of axial seal teeth connected to the axial neck, wherein the mating flange includes a partial segment of a tip portion of an axial seal tooth in the set of axial seal teeth.

9. The seal assembly of claim 8, wherein each of the mating flanges includes at least one of: an axial mating surface, a circumferential mating surface or a radial mating surface.

10. The seal assembly of claim 8, wherein each of the seal assembly elements include a recessed portion disposed proximate a distal end opposite the mating flange, the recessed portion configured to form a multidirectional seal with a mating flange of an adjacent seal assembly element.

11. The seal assembly of claim 8, wherein each recessed portion includes at least one of: an axial mating surface, a circumferential mating surface or a radial mating surface.

12. The seal assembly of claim 8, wherein at least one of the axial seal teeth in each seal assembly element is divided between the mating flange of the seal assembly element and the recessed portion of the complementary seal assembly element.

13. The seal assembly of claim 8, wherein each seal assembly element is further configured with a curved shape.

14. A turbine comprising:
a stator;
a rotor disposed substantially within the stator; and
a seal assembly connected to the stator, the seal assembly comprising:
   a set of seal assembly elements physically connected to one another so as to form a substantially continuous body, wherein each of the seal assembly elements includes:
      a head flange;
      an axial neck connected to the head flange, wherein the axial neck includes a mating flange extending circumferentially from a distal end of the seal assembly element, the mating flange configured to form a multidirectional seal with a recessed portion of a complementary seal assembly element; and
      a set of axial seal teeth connected to the axial neck, wherein the mating flange includes a partial segment of a tip portion of an axial seal tooth in the set of axial seal teeth.

15. The turbine of claim 14, wherein each of the circumferentially mating flanges includes at least one of: an axial mating surface, a circumferential mating surface or a radial mating surface.

16. The turbine of claim 14, wherein each of the seal assembly elements include a recessed portion disposed in a distal end opposite the mating flange, the recessed portion configured to form a multidirectional seal with a mating flange of a complementary seal assembly element and to include at least one of: an axial mating surface, a circumferential mating surface or a radial mating surface.

17. The turbine of claim 14, wherein each mating flange is configured at or radially inboard a steam joint of the turbine.

* * * * *